(12) United States Patent
Cheng

(10) Patent No.: US 7,593,384 B2
(45) Date of Patent: Sep. 22, 2009

(54) EFFICIENT CHANNEL QUALITY REPORTING AND LINK ADAPTATION FOR MULTI-CARRIER BROADBAND WIRELESS COMMUNICATION

(75) Inventor: Jung-Fu Cheng, Cary, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 606 days.

(21) Appl. No.: 11/275,148

(22) Filed: Dec. 15, 2005

(65) Prior Publication Data

US 2007/0141994 A1   Jun. 21, 2007

(51) Int. Cl.
*H04J 1/00* (2006.01)
(52) U.S. Cl. .................... 370/343; 455/17; 455/44; 455/61
(58) Field of Classification Search .............. 370/343; 455/17, 21–23, 42, 44, 61, 102
See application file for complete search history.

(56) References Cited

U.S. PATENT DOCUMENTS 6,904,283 B2 *   6/2005   Li et al. .................... 455/450
2005/0220002 A1  10/2005   Li et al.

* cited by examiner

*Primary Examiner*—Patrick N Edouard
*Assistant Examiner*—Wayne Cai
(74) *Attorney, Agent, or Firm*—Roger S. Burleigh

(57) ABSTRACT

Multi-carrier broadband wireless communication can be supported by providing identification information that identifies a group of carrier frequencies that an intended recipient of a transmission has selected for use in the transmission. A modulation and coding scheme for use in transmitting on the selected group of carrier frequencies is selected based on communication quality information indicative of communication quality associated with transmitting on the selected group of carrier frequencies. Transmission on the selected group of carrier frequencies is performed according to the selected modulation and coding scheme.

9 Claims, 4 Drawing Sheets

US 7,593,384 B2

EFFICIENT CHANNEL QUALITY REPORTING AND LINK ADAPTATION FOR MULTI-CARRIER BROADBAND WIRELESS COMMUNICATION

FIELD OF THE INVENTION

The invention relates generally to wireless communication and, more particularly, to multi-carrier broadband wireless communication.

BACKGROUND OF THE INVENTION

Multi-carrier broadband techniques, such as orthogonal frequency division multiplexing (OFDM), offer the possibility of increasing data rates and throughputs in wireless communications. As is well known in the art, these multi-carrier broadband techniques can provide wideband data rate performance in difficult channels by slicing the spectrum into "chunks" for transmission, optimizing the chunks, and reassembling them at the receiver. Due to the relatively broad frequency spectrum utilized, the channel quality can vary significantly among the multiple frequency carriers.

FIG. 1 graphically illustrates an example 11 of how the channel quality can vary across the occupied spectrum. The channel quality is represented in the FIG. 1 example in terms of SINR (signal-to-interference-and-noise-ratio). More specifically, each "chunk index" value in FIG. 1 corresponds to a group (or chunk) of carrier frequencies, and the curve 11 represents the SINR of the chunks. The carriers within a given chunk are conventionally assumed to have frequency responses that are similar enough to one another to assume that the same modulation and coding scheme (MCS) can be used for each carrier of the group.

The type of wide variation in channel quality illustrated at 11 in FIG. 1 can pose difficulties in the process of selecting a proper MCS, because the selection of the MCS is related closely to the channel quality that is anticipated for the transmission. The MCS selection process, often referred to generally as link adaptation, can be particularly challenging when transmitting information in small blocks, which is common in voice over IP (VOIP) services and several other types of real-time and streaming multimedia services.

In some prior art solutions, the receiver computes an average of the channel quality across the entire utilized spectrum, and feeds this average back to the transmitter. The average SINR shown at 12 in FIG. 1 is an example of such an average channel quality. The average channel quality can be useful if the information bits to be transmitted can be assigned to occupy a significant portion of the utilized spectrum. As examples, average channel quality can be useful for transmissions that can be assigned to occupy all of the chunks of the spectrum, or to occupy chunks distributed across the complete spectrum (e.g., all chunks with an odd chunk index).

However, the actual channel quality of a particular carrier or chunk can vary significantly from the calculated average channel quality. This can be seen in the example of FIG. 1 by comparing the actual channel quality 11 to the average channel quality 12. The deviation of actual channel quality relative to average channel quality can significantly compromise the link adaptation for small information blocks that are assigned to a relatively small portion of the spectrum. Under these circumstances, an MCS choice that is based only on the average channel quality can result in an undesirably high block error rate (BLER), which can lead to increases in latency and system load.

In other prior art solutions, the receiver measures the channel quality of every carrier across the entire spectrum, and feeds this information back to the transmitter for use in link adaptation. Although this approach permits acceptable link adaptation for transmissions of both large and small blocks of information, it typically requires an undesirably large portion of the available radio resources.

It is desirable in view of the foregoing to provide for effective link adaptation with all sizes of transmitted data blocks, while avoiding the aforementioned difficulties associated with prior art solutions.

SUMMARY OF THE INVENTION

Exemplary embodiments of the invention support multi-carrier broadband wireless communications by providing identification information that identifies a group of carrier frequencies that an intended recipient of a transmission has selected for use in the transmission. A modulation and coding scheme for use in transmitting on the selected group of carrier frequencies is selected based on communication quality information indicative of communication quality associated with transmitting on the selected group of carrier frequencies. Transmission on the selected group of carrier frequencies is performed according to the selected modulation and coding scheme.

DETAILED DESCRIPTION

According to exemplary embodiments of the invention, the receiver feeds back to the transmitter one or more channel quality measurements associated with locally best chunks. The transmitter then assigns chunks at and around those locally preferred chunks, and performs the link adaptation based on the channel quality measurements fed back from the receiver. The transmitter can also apply a channel quality mask in the vicinity of the locally preferred chunk. In various embodiments, either the transmitter estimates the channel quality mask, or the receiver feeds the channel quality mask back to the transmitter.

Figure 2:
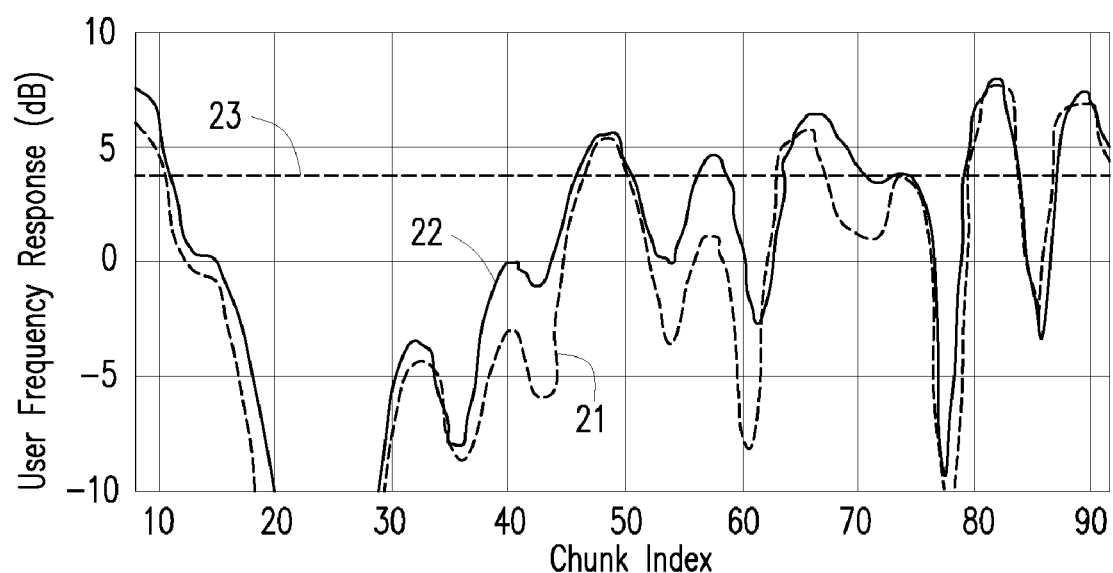
FIG. 2 graphically illustrates the frequency response across the spectrum of an exemplary multi-carrier broadband wireless communication system, which frequency response is used herein to facilitate description of exemplary embodiments of the present invention.

In some embodiments, the receiver feeds back to the transmitter a report that includes chunk information indicative of a locally preferred chunk (e.g., the chunk index for the locally preferred chunk), and channel quality information (e.g., a SINR value) indicative of the channel quality for the locally preferred chunk. In response to this feedback information from the receiver, the transmitter selects the locally preferred chunk, together with additional chunks that encompass carrier frequencies that neighbor the carrier frequencies associated with the locally preferred chunk. FIG. 2 illustrates various exemplary measures of frequency response across the utilized spectrum in an example of a broadband multi-carrier wireless communication system. Reference numeral 21 designates the SINR measured by the receiver, reference numeral 22 designates the SINR during packet transmission, and reference numeral 23 designates the long-term average SINR.

Assuming the conditions in the example of FIG. 2, the receiver can inform the transmitter that the chunk corresponding to index 82 is preferred, and that this preferred chunk has associated therewith a SINR of 8 dB. The transmitter can then assign, for example, chunk indices 80, 81, 82, 83 and 84 for transmitting information to this particular receiver. The transmitter can also provide estimates of the SINRs for the selected neighboring chunks. For example, estimated SINRs for the neighboring chunks at indices 80, 81, 83, and 84 can be provided as 5, 7, 7 and 5 dB, respectively. Thus, the channel quality associated with the aforementioned five chunks assigned for transmission can be written in the form of channel quality mask (in this example, SINR mask) notation, as: SINR=8 +[−3, −1, 0, −1, −3] dB. This channel quality information is then used to perform link adaptations for the assigned chunks. For example, the MCS to be used for transmitting on each chunk can be determined based on the SINR associated with that chunk.

In some embodiments, the above-described channel quality mask is related to the average multi-path fading profile of the broadband wireless channel. For a relatively flat channel, the mask can be relatively wide (i.e., more chunks), with relatively small quality differences between adjacent chunks. For a more dispersive channel, the mask would be narrower (i.e., fewer chunks), with larger quality differences between adjacent chunks.

In some embodiments, the channel quality mask can be provided in a feedback report from the receiver. For example, the receiver can periodically feed back to the transmitter channel quality mask reports that include channel quality information (e.g., SNIR values) associated with all or any selected subset of the chunks contained in the utilized spectrum. In some embodiments, these channel quality mask reports are transmitted less frequently than the aforementioned reporting of the locally preferred chunk and its associated channel quality. For example, some embodiments feed back the channel quality mask reports with a reporting frequency on the order of seconds.

In some embodiments, the transmitter itself constructs the desired channel quality mask, without benefit of the aforementioned channel quality mask report from the receiver. Instead, the transmitter constructs the channel quality mask based on its own measurements of the multi-path channel profile of the reverse link from the receiver. The multi-path channel profile of the reverse link is determined by factors such as the distance between the two communicating devices, the positions of scattering objects, and antenna directions. These same factors play similar roles in determining the multi-path channel profile of the forward link from the transmitter to the receiver. Although the instantaneous multi-path channel responses of the forward and reverse links can differ from one another, the time-averaged profile for the reverse link can be expected to exhibit a stable relationship with the time-averaged profile for the forward link.

In some embodiments where the transmitter uses its own reverse link measurements to estimate channel qualities, the receiver feeds back only the locally preferred chunk information, and the transmitter estimates the associated channel qualities based on the reverse link measurements.

In some embodiments, the receiver can feed back a report that includes indices and corresponding channel quality measurements for more than one locally preferred chunk. Referring again to the example of FIG. 2, the receiver's feedback report could include, for example, chunk index 82 with SINR=8 dB, and chunk index 66 with SINR=7 dB. The transmitter can then, for example, assign for use in transmission:

chunks at indices 80-84 with SINR mask 8 +[−3, −1, 0, −1, −3] dB; and chunks at indices 64-68 with SINR mask 7 +[−3, −1, 0, −1, −3] dB.

These chunks can then be used for transmission to the receiver, with link adaptation performed for each chunk according to the associated SINR from the associated SINR mask.

In some embodiments, the receiver feeds back to the transmitter a report that includes the index and corresponding channel quality information for a locally preferred chunk, and further includes additional information that the transmitter can use to identify the indices of other locally preferred chunks. For example, in some embodiments, the feedback report can include a numerical value that represents a distance between locally preferred chunk indices. Referring again to the example of FIG. 2, the receiver could. for example, feed back a report that identifies chunk index 82 with SINR=8 dB, and further includes a numerical distance value of 16. In response to this feedback information, the transmitter could determine that, in addition to the specifically identified chunk at index 82, there are also locally preferred chunks at, for example, indices 66 (82−16) and 50 (82−(2×16)). The receiver could then assign for use in transmission:

chunks at indices 80-84 with SINR mask 8 +[−3, −1, 0, −1, −3] dB;

chunks at indices 64-68 with SINR mask 8 +[−3, −1, 0, −1, −3] dB; and chunks at indices 48-52 with SINR mask 8 +[−3, −1, 0, −1, −3] dB.

Note that, in this particular example, the receiver simply assumes that the channel quality associated with the chunk at index 66 and the channel quality associated with the chunk at index at 50 are the same as the channel quality that the receiver has reported for the chunk at index 82. Other exemplary embodiments assume other relationships between the channel quality that is fed back from the receiver and the channel qualities associated with the chunk indices that the transmitter identifies based on the aforementioned additional information (e.g., the aforementioned distance value) in the receiver's feedback report. Some embodiments assume that the channel quality decreases with increasing distance from the index that is fed back from the receiver. In one particular example, the transmitter assigns for use in transmission:

chunks at indices 80-84 with SINR mask 8 +[−3, −1, 0, −1, −3] dB;

chunks at indices 64-68 with SINR mask 7 +[−3, −1, 0, −1, −3] dB; and chunks at indices 48-52 with SINR mask 6 +[−3, −1, 0, −1, −3] dB.

In those exemplary embodiments described above where more than one set of chunks are assigned for use in transmission, the same channel quality mask is used with each set of chunks. In other embodiments, the transmitter does not associate the same channel quality mask with each set of chunks. For example, in embodiments as described above wherein the receiver periodically reports the channel quality information for all or a selected subset of the chunks in the occupied spectrum, the transmitter may be able to obtain a channel quality mask for some or all of the selected sets of chunks directly from the corresponding channel quality information contained in the most recent report.

Figure 1:
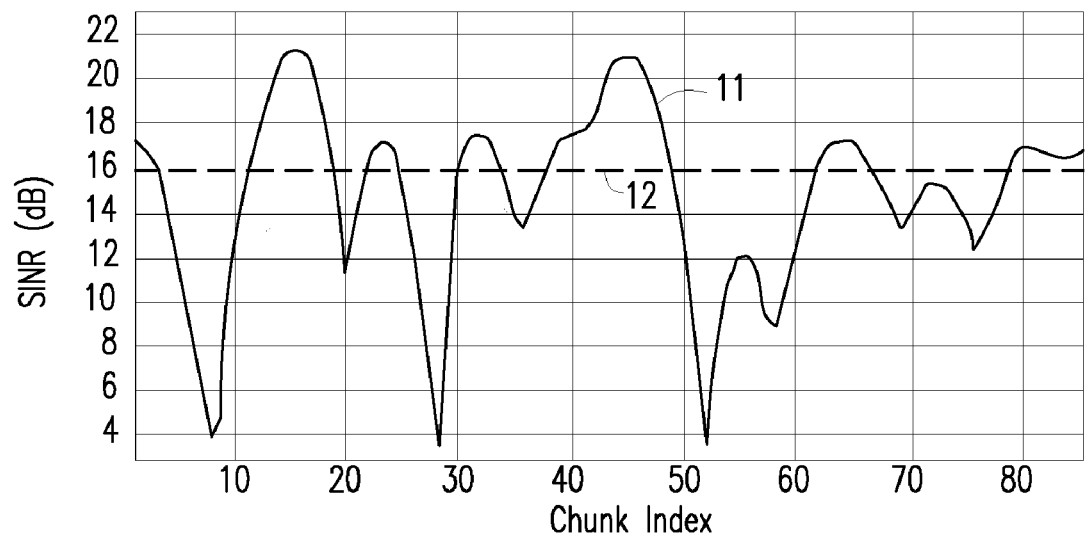
FIG. 1 graphically illustrates the frequency response across the spectrum of a multi-carrier broadband wireless communication system.

In some embodiments, the receiver can include in some or all of its feedback reports an update as to the average of the channel quality of the chunks across the entire utilized spectrum (see 11 in FIG. 1 and 23 in FIG. 2). If the transmitter determines that any of the chunks that it has selected (in accordance with any of the above-described exemplary embodiments) are not available for transmission for any reason, then the receiver can assign available chunks as alternates, and can select the MCS for the alternate chunks based on the current average channel quality. In some embodiments as described above wherein the receiver periodically reports the channel quality information for all or a selected subset of the chunks in the occupied spectrum, the transmitter may be able to select the MCS for some or all of the alternate chunks based on the corresponding channel quality information contained in the most recent report.

In various embodiments, the receiver uses various criteria for selecting the locally preferred chunk(s). For example, in some embodiments, a locally preferred chunk is chosen because, in terms of the most current channel quality measurements, it is the best (or one of the best) chunks. In other embodiments, the selection of the locally preferred chunk is based not only on the most current channel quality measurements, but also on other factors, for example, comparative quality trends among the chunks.

Figure 3:
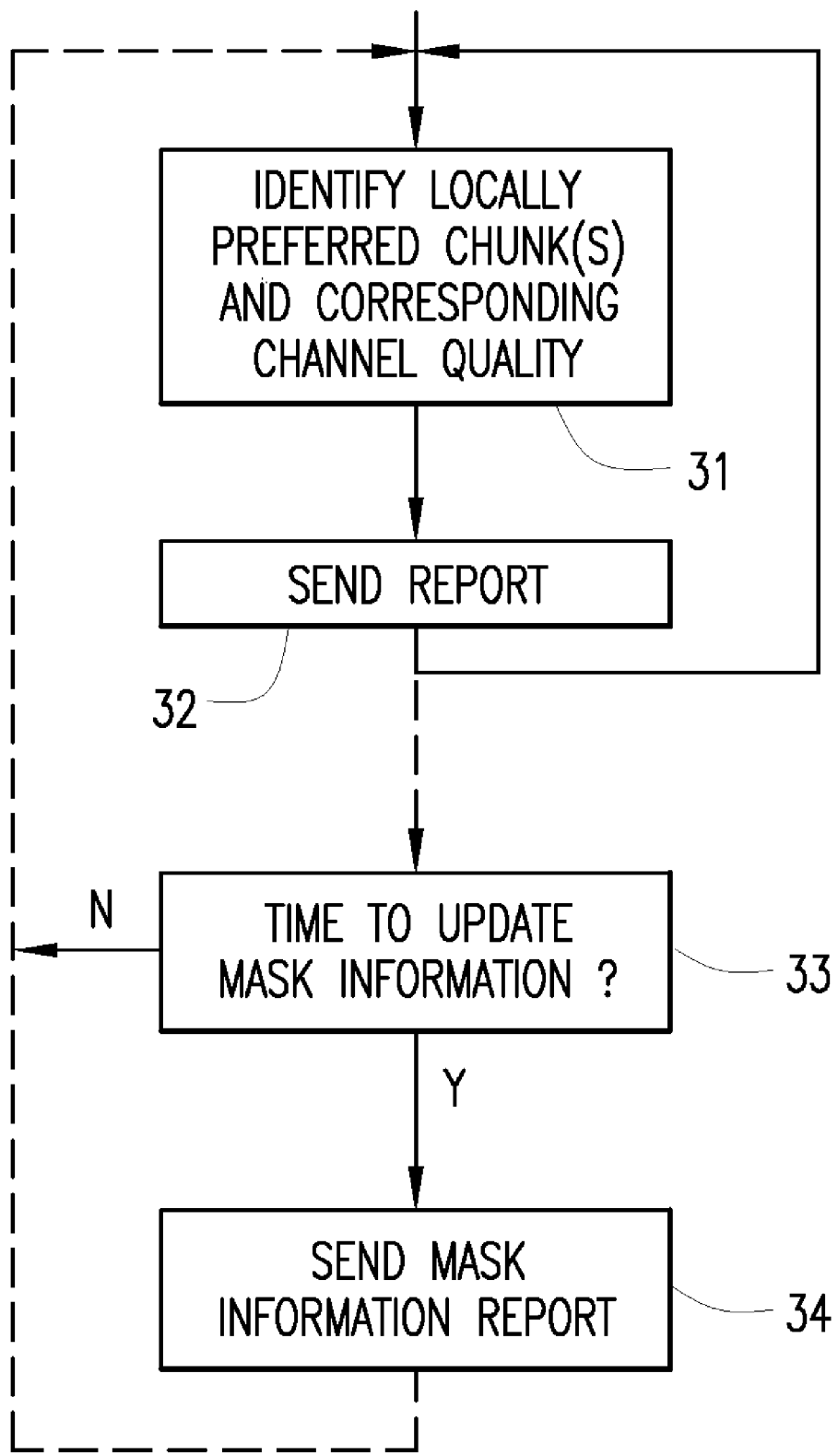
FIG. 3 illustrates exemplary operations that can be performed at the intended receiving end of a multi-carrier broadband wireless transmission according to the invention.
Figure 4:
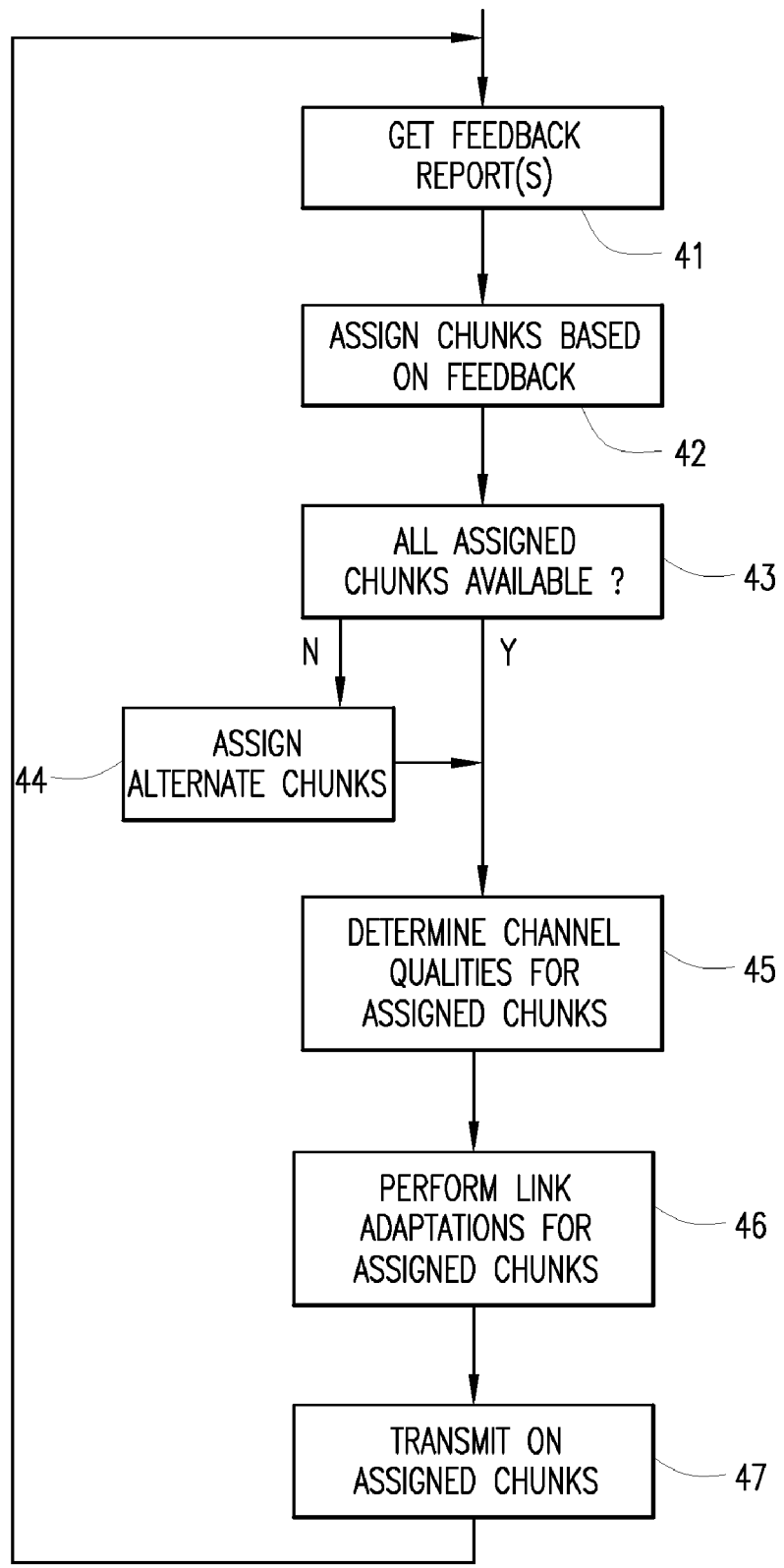
FIG. 4 illustrates exemplary operations that can be performed at the transmitting end of a multi-carrier broadband wireless transmission according to the invention.

FIGS. 3 and 4 provide general illustrations of operations that have been described in detail above with respect to exemplary embodiments of the invention. FIG. 3 illustrates exemplary operations that can be performed at the intended receiving end of a multi-carrier broadband wireless transmission, and FIG. 4 illustrates exemplary operations that can be performed at the transmitting end.

As shown for the receiving end in FIG. 3, one or more locally preferred chunks and corresponding channel quality measures are identified at 31. At 32, information indicative of the chunk(s) and quality measure(s) identified at 31 is sent in a feedback report to the transmitting end. FIG. 3 illustrates, in broken line, additional operations that can be performed in embodiments that provide feedback reports of channel quality mask information. A report of the channel quality mask information is sent at 34 whenever the time for the next report has arrived, as determined at 33.

Referring now to operations at the transmitting end, as shown in FIG. 4, after the feedback reports have been accessed at 41, chunks are assigned at 42 based on the feedback reports. If it is determined at 43 that not all of the assigned chunks are available, then alternate chunks are assigned at 44. Channel qualities associated with the assigned chunks are determined at 45, and link adaptations for the assigned chunks are performed at 46 based on the associated channel qualities. The assigned chunks are then used to transmit the desired communication to the receiving end, as shown at 47.

Figure 5:
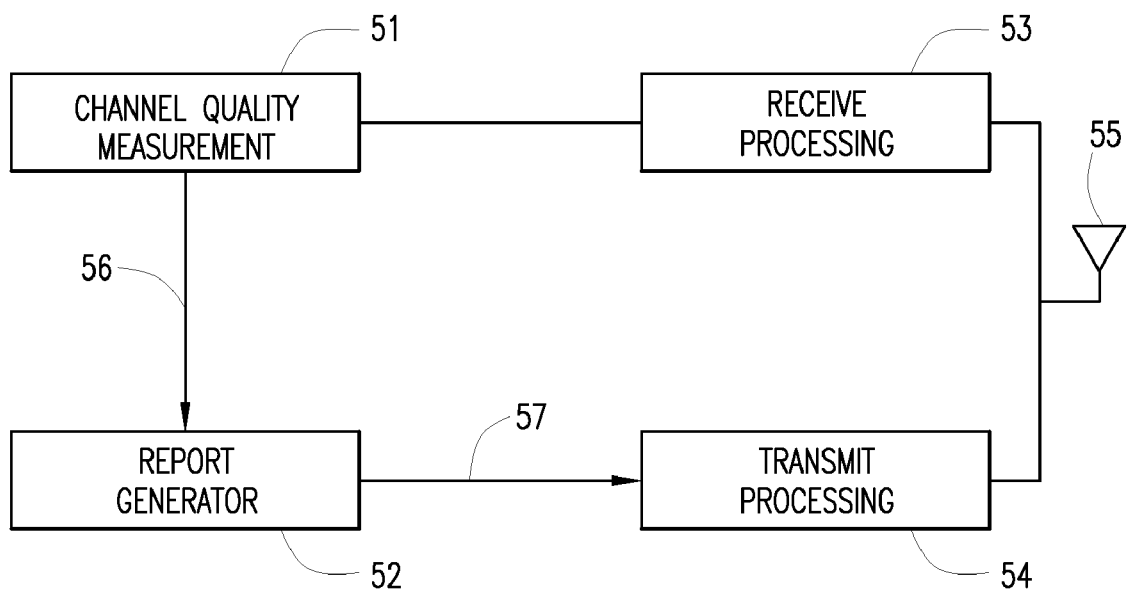
FIG. 5 diagrammatically illustrates a multi-carrier broadband wireless communication apparatus according to exemplary embodiments of the invention.

FIG. 5 diagrammatically illustrates a multi-carrier broadband wireless communication apparatus according to exemplary embodiments of the invention. In some embodiments, the apparatus of FIG. 5 is a mobile apparatus. In various exemplary embodiments, the apparatus of FIG. 5 is capable of performing operations described in detail above and illustrated generally in FIG. 3. The apparatus of FIG. 5 includes an antenna arrangement 55 coupled to a receive processing unit 53 and a transmit processing unit 54, all of which can cooperate in generally conventional fashion to effect desired multi-carrier broadband wireless communications with other communication devices. A channel quality measurement unit 51 coupled to the receive processing unit 53 produces channel quality measurement information (e.g., SINR information) in response to wireless communication signaling received from a further multi-carrier broadband wireless communication apparatus.

The channel quality measurement information, shown generally at 56, is provided to a report generator 52. Based on the channel quality measurement information 56, the report generator 52 can generate reports, for example, any of those described in detail above. These reports, designated generally at 57, are forwarded to the transmit processing unit 54, which cooperates with the antenna assembly 55 to transmit the reports as feedback to the aforementioned further multi-carrier broadband wireless communication apparatus. This further communication apparatus (exemplary embodiments of which are shown in FIG. 6) can then use the feedback reports, in any of the exemplary manners described in detail above, to support link adaptation operations associated with its transmissions to the apparatus of FIG. 5.

Figure 6:
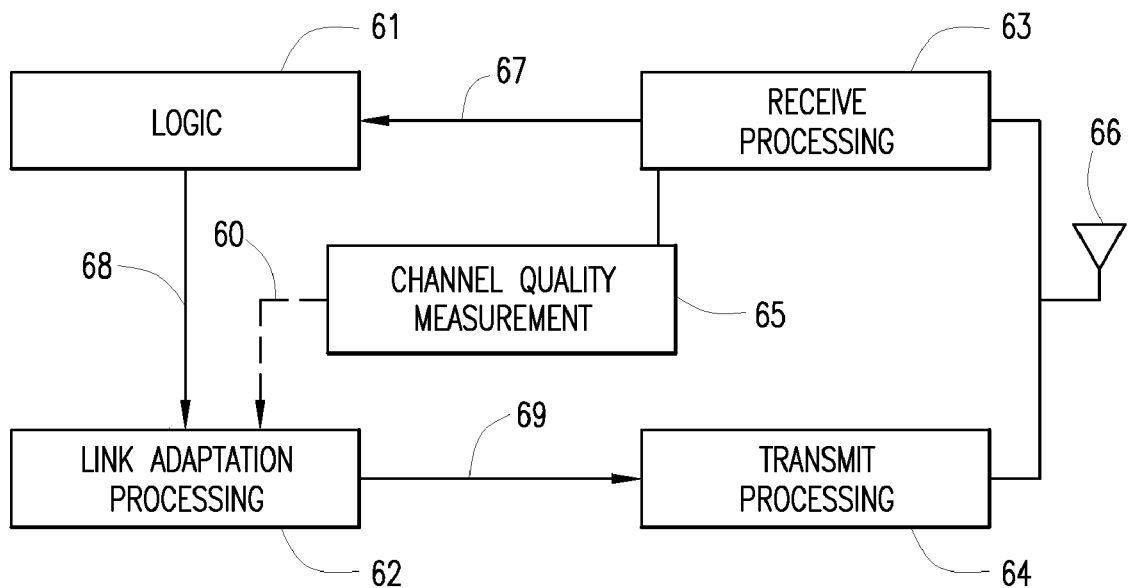
FIG. 6 diagrammatically illustrates a further multi-carrier broadband wireless communication apparatus according to exemplary embodiments of the invention.

FIG. 6 diagrammatically illustrates a further multi-carrier broadband wireless communication apparatus according to exemplary embodiments of the invention. In some embodiments, the apparatus of FIG. 6 is a fixed-site apparatus. In various exemplary embodiments, the apparatus of FIG. 6 is capable of performing operations described in detail above and illustrated generally in FIG. 4. The apparatus of FIG. 6 includes an antenna arrangement 66 coupled to a receive processing unit 63 and a transmit processing unit 64, all of which can cooperate in generally conventional fashion to effect desired multi-carrier broadband wireless communications with other communication devices. Logic 61 is coupled to the receive processing unit 63 to receive feedback reports, for example, any of those described in detail above and illustrated at 57 in FIG. 5.

The logic 61 can utilize the feedback reports 67 in any of the exemplary manners described in detail above to produce chunk indices and corresponding channel qualities, designated generally at 68, for use by a link adaptation unit 62. In response to the chunk indices and corresponding channel qualities at 68, the link adaptation unit 62 makes suitable MCS selections, and forwards to the transmit processing unit 64 information 69 indicative of the chunks and MCSs to be used for transmission to the communication apparatus (e.g., the apparatus of FIG. 5) that provided the feedback reports.

FIG. 6 also illustrates embodiments wherein the apparatus uses its own channel quality measurement unit 65 to obtain channel quality (e.g., SINR) measurements from the reverse link, and then uses this reverse link channel quality information to estimate the channel qualities for chunks identified in the feedback reports 67. Broken line 60 illustrates the reverse link channel quality measurements provided by the channel quality measurement unit 65 to the link adaptation unit 62.

As can be seen from the foregoing, exemplary embodiments of the present invention provide, in a multi-carrier broadband wireless communication system, effective link adaptation that can be implemented efficiently with respect to the available radio resources, regardless of the size of the transmitted data blocks. Workers in the art will also recognize that the exemplary embodiments described above can be implemented, for exmaple, in hardware, software, and suitable combinations of hardware and software.

Although exemplary embodiments of the invention have been described above in detail, this does not limit the scope of the invention, which can be practiced in a variety of embodiments.

What is claimed is:

1. A method for use in a multi-carrier broadband receiver, said method comprising the steps of:
   determining a preferred chunk index that identifies a preferred group of carrier frequencies that the receiver has identified for use in transmissions from said transmitter to said receiver;
   determining a distance parameter indicative of at least one additional group of carrier frequencies that said receiver has identified for potential use in said transmission, wherein said distance parameter is a function of the difference between said preferred chunk index and the chunk index of said additional group of carrier frequencies; and,
   transmitting information from said receiver to a transmitter that includes said preferred chunk index and said distance parameter, whereby said transmitter can, as a function of said preferred chunk index and said distance parameter, select a modulation and coding scheme for use in transmitting on said preferred group and said at least one additional group of carrier frequencies.

2. The method recited in claim 1, wherein said receiver dynamically identifies said preferred group of carrier frequencies as a function of a plurality of measured signal-to-interference-and-noise ratios (SINR).

3. The method recited in claim 2, further comprising the step of transmitting communication quality information including at least the SINR value determined by said receiver for said preferred group of carrier frequencies.

4. The method recited in claim 3, wherein said communication quality information comprises a channel quality mask determined by said receiver, said channel quality mask being a function of a plurality of measured SINR values for said preferred group and said at least one additional group of carrier frequencies.

5. The method recited in claim 2, wherein said step of determining said distance parameter comprises the step of dynamically computing an average distance that approximates the separation between said preferred group of carrier frequencies and a plurality of additional group of carrier frequencies with the highest measured SINR values.

6. The method recited in claim 2, wherein said transmitter performs link adaptation for each group of said carrier frequencies as a function of said SINR.

7. A method for use in a multi-carrier broadband transmitter, said method comprising the steps of:
   receiving information from a receiver that includes:
      a preferred chunk index that identifies a preferred group of carrier frequencies that the receiver has identified for use in transmissions from said transmitter to said receiver;
      a distance parameter indicative of at least one additional group of carrier frequencies that said receiver has identified for potential use in said transmission, wherein said distance parameter is a function of the difference between said preferred chunk index and the chunk index of said additional group of carrier frequencies; and,
   based, at least in part on said received information, selecting a modulation and coding scheme for use in transmitting on said preferred group and said at least one additional group of carrier frequencies.

8. The method recited in claim 7, further comprising the step of receiving communication quality information including a signal-to-interference-and-noise ratio (SINR) value determined by said receiver for said preferred group of carrier frequencies.

9. The method recited in claim 8, wherein said step of selecting a modulation and coding scheme for use in transmitting on said preferred group and said at least one additional group of carrier frequencies comprises the step of performing link adaptation for each group as a function of said SINR.

* * * * *

UNITED STATES PATENT AND TRADEMARK OFFICE
CERTIFICATE OF CORRECTION

PATENT NO.         : 7,593,384 B2
APPLICATION NO. : 11/275148
DATED              : September 22, 2009
INVENTOR(S)      : Cheng It is certified that error appears in the above-identified patent and that said Letters Patent is hereby corrected as shown below:

In Column 1, Line 43, delete "(VOIP)" and insert -- (VoIP) --, therefor.

In Column 3, Line 44, delete "SNIR" and insert -- SINR --, therefor.

In Column 4, Line 31, delete "could." and insert -- could, --, therefor.

In Column 7, Line 3, delete "exmaple," and insert -- example, --, therefor.

Signed and Sealed this

Twenty-ninth Day of December, 2009

David J. Kappos
*Director of the United States Patent and Trademark Office*